March 3, 1953 P. J. KIRCHER 2,630,233
INSERTABLE HOLDER FOR VACUUM BOTTLES
Filed Feb. 24, 1950
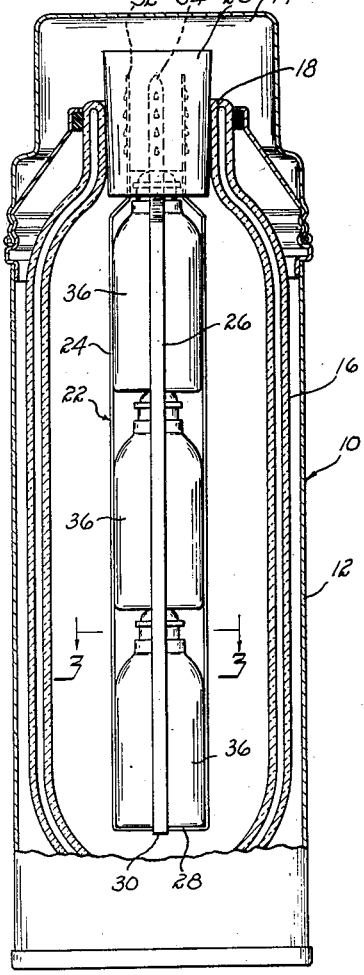
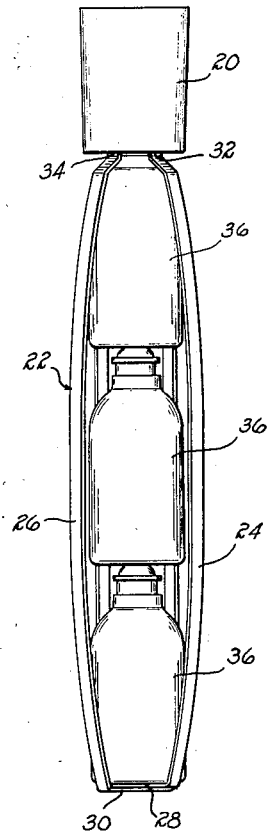
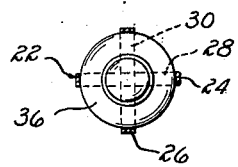
Inventor
PAUL J. KIRCHER
By
Lindsey, Prutzman + Just
Attorneys Patented Mar. 3, 1953

2,630,233

UNITED STATES PATENT OFFICE 2,630,233

INSERTABLE HOLDER FOR VACUUM BOTTLES

Paul J. Kircher, Plainville, Conn., assignor to Landers, Frary & Clark, New Britain, Conn., a corporation of Connecticut Application February 24, 1950, Serial No. 146,063

2 Claims. (Cl. 215—100)

This invention relates to a holder insertable within a vacuum bottle and, more particularly, to a holder capable of releasably retaining one or more ampules so as to support the same for storage within a vacuum bottle.

It is frequently necessary to maintain ampules and the like containing serum, for example, within refrigerated atmospheres so as to maintain the serum in usable condition. Such serum can conveniently be stored in refrigerators but, if it is necessary to transport limited numbers of such ampules for appreciable periods of time, maintaining the transported ampules in refrigerated atmospheres is usually not conveniently possible, except possibly by makeshift means.

It is an object of the present invention to provide a simple, durable, and inexpensive holder capable of releasably retaining one or a limited number of ampules and the like within a vacuum bottle, whereby such ampules may be maintained in an atmosphere of suitable temperature for reasonable periods of time and conveniently removed from said vacuum bottle when desired for use.

Another object of the invention is to provide a holder of this nature which is capable of holding the ampules out of contact with the interior of the vacuum bottle so as to prevent damage to the bottle and ampules alike and also provide a holder which will permit ampules to simply be snapped into or out of it when desired.

Details of these objects and of the invention, as well as other objects thereof, are set forth in the following specification and are illustrated in the attached drawings forming a part thereof.

In the drawings:

Figure 1 is a side elevation, mainly in section, of an exemplary vacuum bottle in which a holder embodying the principles of the present invention is mounted.

Fig. 2 is a side elevation of the holder per se embodying the present invention and attached to the stopper of a vacuum bottle, said holder being shown in position to permit an ampule to be removed from or inserted within said holder.

Fig. 3 is a cross-sectional view of the holder and an ampule taken on line 3—3 of Fig. 1.

Referring to the drawing, in which like reference numerals are used to indicate like parts, an exemplary vacuum bottle 10 is shown in Fig. 1, the same comprising a conventional case 12 separable cover 14, and an evacuated double-walled bottle insert 16 mounted within the case 12. The mouth 18 of the bottle insert is closed by a conventional closure or stopper 20 which may be formed from any suitable material such as cork.

In accordance with the present invention, a holder generally indicated 22 is connected to the inner end of the stopper 20 so as to be insertable through the mouth 18 of the bottle insert 16 and be supported within said insert by the stopper 20. The holder 22 comprises a cage-like structure and, in the preferred embodiment of the invention, consists of a pair of elongated U-shaped members 24 and 26. Said members may be formed from any suitable material such as resilient flat strips of stainless steel which have been spring tempered to permit relatively easy flexing thereof. It is conceivable, however, that other shapes of material may be used such as round wire or other kinds of strip material having suitable cross-section shapes. Preferably, the material used should be rust or corrosion resistant, particularly when the holder is to be used for retaining bottles or ampules for medicinal purposes.

The U-shaped members 24 and 26 are nested in such manner that the bent ends 28 and 30 are in engagement with each other, as shown in Fig. 2, and are also disposed at right angles to each other, as shown in Fig. 3 to form a cage-like structure. The other ends 32 and 34 generally pointed are to comprise prongs provided with barbs, said prongs being offset inwardly from the major portions of members 24 and 26, as illustrated in Figs. 1 and 2. Said prongs are readily insertable solidly within the inner end of the stopper 20 of the vacuum bottle for firm support thereby. The greatest distance between the outer surfaces of the legs of members 24 and 26 is preferably less than the average mean diameter of the stopper 20 and, in any event, is less than the diameter of the opening in the mouth 18 of the vacuum bottle insert, whereby the holder 22 may easily be inserted within the mouth 18 of the bottle insert. The stopper 20, when moved into frictional engagement with the mouth 18, effectively supports the holder 22 within the bottle insert 16 and in spaced relation to the inner walls thereof.

As will be seen in the figures, a plurality of ampules 36 are mounted within the holder 22 between the side legs of the U-shaped members forming the cage-like structure so as to prevent accidental removal therefrom. The ampules 36 may be inserted within or removed from the holder 22 by spreading apart the intermediate portions of two adjacent side members or legs of the U-shaped members 24 and 26, as shown in Fig. 2, whereby the intermediate ampule 36, as viewed in Figs. 1 and 2, may be snapped into the holder 22. To completely load or fill the holder 22, ampules are first inserted into the intermediate portion of the holder 22 in the manner just described and then moved into the opposite ends of the holder 22. The ampule to be last inserted is merely snapped into the intermediate portion of the holder and the intermediate portions of the side legs of the U-shaped members 24 and 26 snap into their normal holding position to enclose and hold all the ampules in compact arrangement within the holder 22. The loaded holder 22 and stopper 20 are then inserted within the vacuum bottle insert 16 through the mouth 18 thereof and the stopper frictionally engages the walls of said mouth to hold the holder in storage position within the bottle insert.

Removal of the ampules from the holder 22 may be accomplished in reverse order to that in which they are inserted by first removing the ampule in the intermediate portion of the holder simply by snapping it from between two adjacent side legs of the U-shaped members 24 and 26 and subsequently moving the ampules in the ends of the holder to the intermediate position with the holder and then snapping said ampules from between any two adjacent side legs of members 24 and 26.

From the foregoing, it will be seen that the present invention provides a simple, inexpensive, and effective means for holding small containers such as ampules and the like within a vacuum bottle so as to maintain said ampules within the vacuum bottle at any desired temperature for reasonably long periods of time, whereby such ampules may be readily transported at such desired temperatures. The holder for the ampules may not only readily be attached to the stoppers of new vacuum bottles but such holders may also readily be attached to stoppers of vacuum bottles already in use without requiring the use of any special tools or a skilled person to make such attachment.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. A holder for supporting ampules and the like in suspended position within a vacuum bottle and comprising a generally cylindrical cage-like structure including a plurality of elongated U-shaped members formed from flat spring strips and nested in crossed relation to each other at the closed ends thereof, the free end portions of said members being substantially straight and each end portion having a pointed extremity and at least one barb to facilitate said ends being embedded within and retained by a stopper of a vacuum bottle, whereby said holder may be supported by said stopper within said vacuum bottle, and the intermediate portions of adjacent side legs of said members being capable of being flexed apart to permit said ampules to be snapped into and out of said holder.

2. A holder for supporting ampules and the like in suspended position within a vacuum bottle and comprising in combination, a stopper for a vacuum bottle, and a generally cylindrical cage-like structure comprising a plurality of elongated U-shaped members formed from flat spring strips and nested in crossed relation to each other at the closed ends thereof, the free ends of said members being offset inwardly from the planes of said strips and shaped to provide barbed prongs embedded within said stopper to connect said cage-like structure thereto as a unit, whereby said holder may be supported by said stopper within a vacuum bottle when said stopper is operatively positioned within the mouth of a vacuum bottle, the intermediate portions of the adjacent side legs of said U-shaped members being capable of being flexed apart to permit said ampules to be snapped into and out of said holder and the greatest cross-sectional dimension of said cage-like structure being less than the average mean diameter of said stopper.

PAUL J. KIRCHER.

REFERENCES CITED

The following references are of record in the file of this patent:

UNITED STATES PATENTS

| Number | Name | Date |
|---|---|---|
| 353,147 | Lederle | Nov. 23, 1886 |
| 937,049 | Callahan | Oct. 19, 1909 |
| 1,191,165 | Eisenhardt | July 18, 1916 |
| 1,408,757 | Metzger | Mar. 7, 1922 |
| 1,911,969 | Prendergast | May 30, 1933 |
| 2,100,172 | Riegel | Nov. 23, 1937 |
| 2,127,607 | Levow | Aug. 23, 1938 |